(12) United States Patent
Gaur et al.

(10) Patent No.: US 10,497,200 B2
(45) Date of Patent: Dec. 3, 2019

(54) SYSTEM AND METHOD FOR REMOTELY CONTROLLING DISPENSING OF PRODUCT(S) FROM A VENDING DEVICE

(71) Applicant: VENDEKIN TECHNOLOGIES PRIVATE LIMITED, Pune, Maharashtra (IN)

(72) Inventors: Anshoo Gaur, Naperville, IL (US); Aroon Ashish Khatter, Dover, DE (US)

(73) Assignee: VENDEKIN TECHNOLOGIES PRIVATE LIMITED (IN)

( * ) Notice: Subject to any disclaimer, the term of this patent is extended or adjusted under 35 U.S.C. 154(b) by 128 days.

(21) Appl. No.: 15/662,340

(22) Filed: Jul. 28, 2017

(65) Prior Publication Data

US 2018/0300981 A1 Oct. 18, 2018

(30) Foreign Application Priority Data

Apr. 14, 2017 (IN) .............................. 201721013407

(51) Int. Cl.
| | |
|---|---|
| *G07F 11/00* | (2006.01) |
| *G06Q 10/08* | (2012.01) |
| *G06Q 20/18* | (2012.01) |
| *H04W 4/00* | (2018.01) |
| *G06K 19/06* | (2006.01) |
| *H04W 4/80* | (2018.01) |

(52) U.S. Cl.
CPC ...... *G07F 11/002* (2013.01); *G06K 19/06037* (2013.01); *G06K 19/06112* (2013.01); *G06Q 10/087* (2013.01); *G06Q 20/18* (2013.01); *H04W 4/80* (2018.02)

(58) Field of Classification Search
CPC .... G07F 11/002; G06Q 10/087; G06Q 20/18; G06K 19/06037; G06K 19/06112; H04W 4/80
USPC .................................................. 700/231–244
See application file for complete search history.

(56) References Cited

U.S. PATENT DOCUMENTS

| | | | | |
|---|---|---|---|---|
| 6,584,309 B1 * | 6/2003 | Whigham | ............ | G06Q 10/087 455/407 |
| 6,784,874 B1 * | 8/2004 | Shimizu | ................ | G06Q 20/00 345/169 |

(Continued)

FOREIGN PATENT DOCUMENTS

EP 2930677 A1 10/2015

*Primary Examiner* — Michael Collins
(74) *Attorney, Agent, or Firm* — Dilworth IP, LLC

(57) ABSTRACT

A system and method for remotely controlling dispensing of product(s) from a vending device is disclosed. The system may identify a vending device within predefined range of a location of a user device. The system may enable auto pairing of the user device with the vending device. The system may enable the user to select a product from a product list displayed on the user device, wherein the product list is received either from a processing unit of the vending device or the system. The system may transmit the information to the processing unit after completion of transaction associated with the product selected by the user. The processing unit may decode the vending data from the information to trigger dispensing of the product from the vending device. The dispensing of the product is facilitated via a vending machine controller (VMC) of the vending device or directly through the processing unit.

18 Claims, 10 Drawing Sheets

(56) References Cited

U.S. PATENT DOCUMENTS

| | | |
|---|---|---|
| 6,794,634 B2 | 9/2004 | Hair, III et al. |
| 7,079,922 B2 * | 7/2006 | Komai ................ G06Q 20/206 455/420 |
| 7,593,897 B1 | 9/2009 | Kolls |
| 8,600,899 B1 | 12/2013 | Davis |
| 8,774,963 B2 * | 7/2014 | Signorelli .............. G06Q 20/20 700/232 |
| 9,256,873 B2 | 2/2016 | Patel et al. |
| 9,870,670 B2 * | 1/2018 | Yau .......................... G07F 7/06 |
| 10,109,143 B2 * | 10/2018 | Signorelli .............. G06Q 20/20 |
| 2002/0128932 A1 * | 9/2002 | Yung .................... G06Q 10/087 705/26.1 |
| 2005/0228720 A1 * | 10/2005 | Pavlic ................... G06Q 20/04 705/16 |
| 2013/0054010 A1 * | 2/2013 | Holman ................ G06Q 10/10 700/232 |
| 2014/0309770 A1 * | 10/2014 | Signorelli .............. G06Q 20/20 700/232 |
| 2014/0358705 A1 | 12/2014 | Harrington et al. |
| 2015/0045947 A1 * | 2/2015 | Yau .......................... G07F 7/06 700/237 |
| 2015/0235202 A1 | 8/2015 | Zabala |
| 2017/0330164 A1 * | 11/2017 | Suelberg .............. G06Q 20/203 |
| 2019/0057569 A1 * | 2/2019 | Signorelli .............. G06Q 20/20 |

* cited by examiner

SYSTEM AND METHOD FOR REMOTELY CONTROLLING DISPENSING OF PRODUCT(S) FROM A VENDING DEVICE

CROSS-REFERENCE TO RELATED APPLICATIONS AND PRIORITY

The present application claims priority from Indian Provisional Patent Application No. 201721013407 filed on 14 Apr. 2017 which is incorporated herein by a reference.

TECHNICAL FIELD

The present invention in general relates to a system and method for remotely controlling dispensing of product(s) from a vending device.

BACKGROUND

Vending device enables dispensing products or items such as snacks, beverages, tickets or any other products or services to the customers automatically once the customer inserts currency coins or notes into the said vending device. Such devices typically contain a number of different products/services from which the consumer may choose a desired product/service to be vend by the vending device. After inserting the appropriate amount of money into the vending device and entering a product selection, the selected goods are dispensed to the consumer. Various vending devices are usually installed in airports, railway stations, pubs, cafés, shopping malls, other publicly accessible buildings and streets to provide easy access to the users.

Some vending devices allow the customer to pay by swiping credit cards or any other type of smart card. But, one may find it annoying to carry all the cards every time as most of the transactions are done by using cashless payment methods such as digital wallets, internet banking etc. Further, the vending devices available today enables transactions in accordance with a specific protocol thereby limiting the transactions supported by the said specific protocol such as MDB/VCCS/BDV, and the like. The primary function of these protocols is to convert cash/electronic money to "credit to the device". Though the primary function of these protocols is to facilitate the consumer transactions, optionally, these protocols may be capable of holding auxiliary information including compartment and tray of product selection, success and/or failure of the vending machine in dispensing a product or a service, and the like. Further, if any of the specific protocol does not support a particular online transaction means, the vending device itself has to be replaced with another vending device to support a specific online transaction means as desired. Therefore, the existing vending device lack providing flexible payment options to the user. Additionally, since the user must manually select the product from the multiple products, there is a chance of erroneously selecting other product by the user which she didn't wish to purchase/order on the vending device thereby resulting in dispending of incorrect product to the user.

SUMMARY

Before the present system and its method of use is described, it is to be understood that this disclosure is not limited to the particular apparatus and its arrangement as described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is not intended to identify essential features of the subject matter nor it is intended for use in detecting or limiting the scope of the proposed subject matter.

In one embodiment, a processing unit to enable controlling of dispensing of product(s) from the vending device is described. The processing unit may comprise a processor, a communication port/interface, a transceiver and a memory coupled with the processor. In one aspect, the communication port/interface may be configured to retrofit the processing unit to the Vending Machine Controller (VMC) in order to control dispensing of the product(s) from the vending device. The transceiver may be configured to communicate with the user device. The processor may be configured to execute programmed instructions stored in the memory. The processor may execute programmed instructions for enabling auto-pairing of the vending device with the user device. The vending device is within a predefined range of the location of the user device. The processor may further execute programmed instructions for receiving information from the user device, wherein the user device may be configured to receive the information in response to transaction corresponding to one or more products selected from a product list displayed on the user device. The processor may further execute programmed instructions for decoding vending data from the information and further transmitting the vending data to a Vending Machine Controller (VMC) in order to enable dispensing of a product from the vending device.

In another embodiment, a processing unit to enable controlling of dispensing of product(s) from the vending device is described. The processing unit may comprise a processor; a transceiver configured to communicate with the user device and a memory coupled with the processor. The processor may be configured to execute programmed instructions stored in the memory. The processor may execute programmed instructions for enabling auto-pairing of the vending device with the user device. The vending device may be within a predefined range of the location of the user device. The processor may be configured to execute programmed instructions for receiving information from the user device, wherein the user device is configured to receive the information in response to transaction corresponding to one or more products selected from a product list displayed on user device. The processor may be configured to execute programmed instructions for decoding vending data from the information in order to enable dispensing of a product from the vending device.

In yet another embodiment, a system for remotely controlling dispensing of product(s) from a vending device is described. The system may comprise a processor and a memory coupled with the processor. The processor may be configured to execute programmed instructions stored in the memory. The processor may execute programmed instructions for identifying a vending device within predefined range from a location of a user device. The processor may be configured to execute programmed instructions for enabling the user to select, via the user device, a product of a plurality of products capable of being vend through the vending device. The processor may be configured to execute programmed instructions for transmitting information to the vending machine, wherein a processing unit, retrofitted with the vending device, may be configured to decode vending data from the information in order to enable dispensing of the product from the vending device.

In yet another embodiment, a method for remotely controlling dispensing of product(s) from a vending device is described. The method may comprise identifying, via a processor, a vending device within a predefined range of the location of the user device. The method may further comprise enabling the user, via the processor, to select a product of a plurality of products capable of being vend through the vending device. The method may further comprise transmitting, via the user device, information to a processing unit retrofitted with the vending device, wherein the processing unit is configured to decode vending data from the information in order to enable dispensing of the product from the vending device.

BRIEF DESCRIPTION OF DRAWINGS

The detailed description is described with reference to the accompanying Figures. In the Figures, the left-most digit(s) of a reference number identifies the Figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that, the singular forms "a," "an," and "the" include plural references unless the context clearly dictates otherwise. Although any methods similar or equivalent to those described herein can be used in the practice or testing of embodiments of the present disclosure, the exemplary methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Though the below description, in conjunction with the drawings, has been described considering the vending device as a vending machine, however, the present disclosure is not necessarily limited to the vending machine as described below and the vending device herein may include any unmanned device that may be used for dispensing any product or a service.

Figure 1:
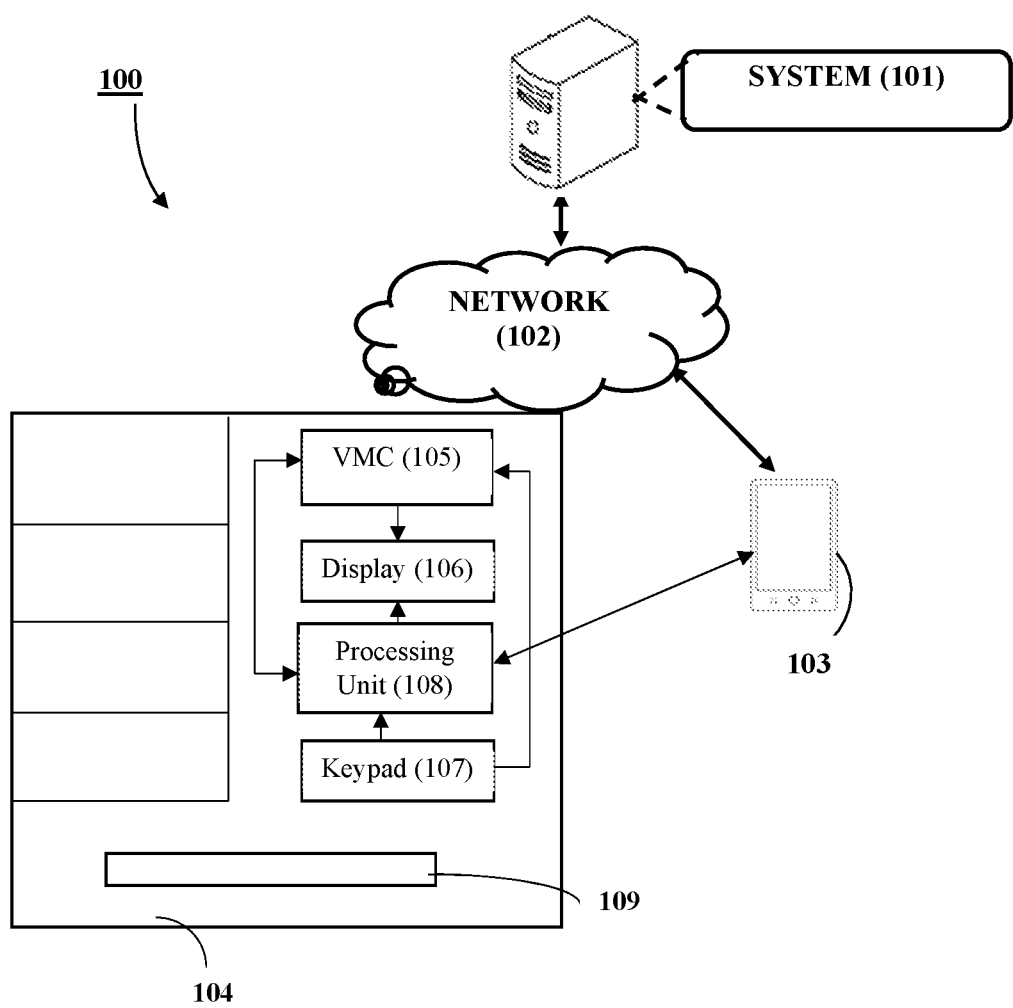
FIG. 1 illustrates an implementation 100 of a system 101 for remotely controlling dispensing of product(s) from the vending device, in accordance with an embodiment of the present subject matter.

Referring to FIG. 1, a network implementation 100 of a system 101 for remotely controlling dispensing of product(s) from the vending device is illustrated, in accordance with an embodiment of the present subject matter. As shown in FIG. 1, a vending device 104 may be provided, wherein the vending device 104 may further comprise a vending machine controller 105 (also to be referred as VMC 105 hereinafter), a display 106, a keypad 107 and a processing unit 108. The processing unit 108 may be communicatively coupled with a user device 103. In one embodiment, the processing unit 108 may communicate with the user device 103 through a short-range wireless communication protocol selected from a group comprising, but not limited to, Bluetooth communication protocol, Near Field Communication (NFC), Radio Frequency (RF) protocol, an infra-red (IR) protocol, ZigBee protocol and the like. In another embodiment, the processing unit 108 may communicate with the user device 103 through a router (not shown) present within the vending device 104. Further, the user device 103 may be communicatively coupled with the system 101.

Although the present subject matter is explained considering that the system 101 is implemented as on a server, it may be understood that the system 101 may also be implemented in a variety of computing systems, such as a laptop computer, a desktop computer, a notebook, a workstation, a mainframe computer, a server, a network server, and the like. It will be understood that the system 101 may be accessed by multiple users through one or more user devices 103-1, 103-2 . . . 103-N, collectively referred to as user 103 hereinafter, or applications residing on the user devices 103. Examples of the user devices 103 may include, but are not limited to, a portable computer, a personal digital assistant, a handheld device, and a workstation. The user devices 103 are communicatively coupled to the system 101 through a network 102.

In one implementation, the network 102 may be a wireless network, a wired network or a combination thereof. The network 102 can be accessed by the user device 104 using wired or wireless network connectivity means including updated communications technology. The network 102 can be implemented as one of the different types of networks, such as intranet, local area network (LAN), wide area network (WAN), the internet, and the like. The network 102 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 102 may include a variety of network devices, including routers, bridges, servers, computing devices, storage devices, and the like.

In one embodiment, the VMC 105 may be configured to dispense product after insertion of the coin or notes (i.e. cash) in the vending device. In another embodiment, the VMC 105 may dispense the product after successful completion of ab electronic transaction/money. A protocol selected from a group comprising, but not limited to, an MDB protocol, a VCCs protocol, and a BDV protocol may be configured to convert the cash or the electronic money into a credit to the vending machine 104. Based upon such conversion of cash/electronic money to the credit, the VMC may be configured to dispense the product. The VMC 105 may be electronically coupled with the display 106, the keypad 107, the processing unit 108 and a dispensing unit 109. The processing unit 108 may be coupled with ports of the keypad 107 and the VMC 105.

Figure 2:
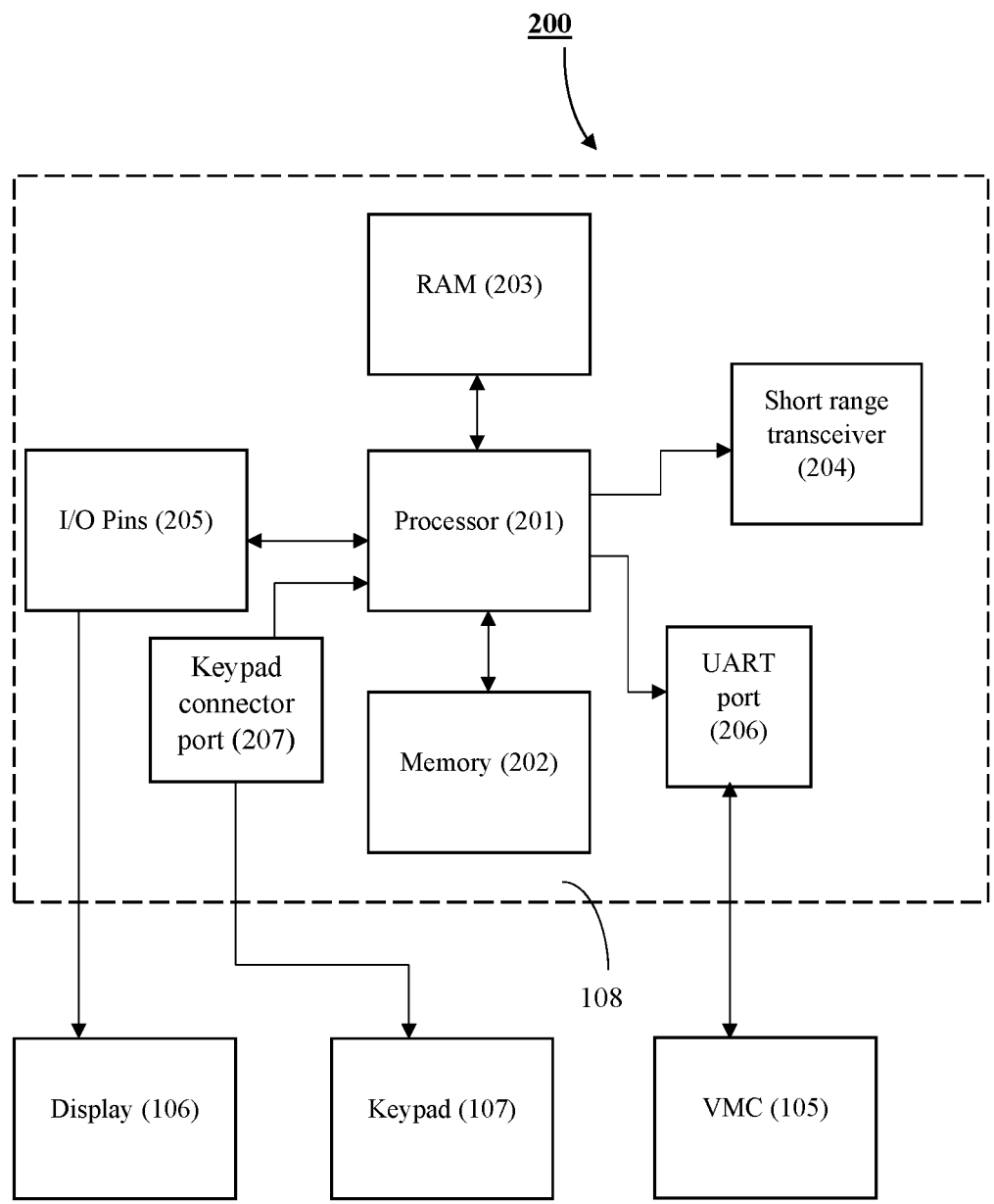
FIG. 2 illustrates a block diagram 200 depicting components of a processing unit 108 within the vending device, in accordance with an embodiment of the present subject matter.

Referring to FIG. 2, a block diagram 200 depicting components of the processing unit 108 within the vending device is illustrated, in accordance with an embodiment of the present subject matter. In one embodiment, the processing unit 108 may comprise a processor 201, a memory 202, a Random-Access Memory (RAM) 203, a short-range transceiver 204, I/O pins 205, a UART port 206, a keypad connector port 207. In one embodiment, the processor 201 may be electronically coupled with the memory 202, the RAM 203, the short-range transceiver 204, the I/O pins 205, the UART port 206 and the keypad connector port 207. In one embodiment, the display 106 may be electronically coupled with the processor 201 via the I/O pins 205. In one embodiment, the processor 201 may be electronically coupled with the keypad 107 through the keypad connector port 207. In one embodiment, the processing unit 108 may be electronically coupled with the VMC 105 through the communication port/interface. In one exemplary embodiment, the communication port/interface is UART port 206. In one embodiment, the processing unit 108 may comprise one or more UART ports. In one embodiment, the processing unit 108 may be electronically coupled to the VMC 105 in order to control dispensing of the product(s) from the vending device. In one embodiment, the VMC 105 may comprise one or more MDB ports for providing connection interface for cash acceptor unit of the vending device and the processing unit 108. Further, the VMC 105 may comprise one or more keypad connector ports for providing connection interface for the keypad of the vending device and the processing unit 108. In one embodiment, the short-range transceiver 204 may be configured to enable communication between the processing unit 108 and the user device 103 using a short-range communication protocol.

In one embodiment, the memory 203 is coupled with the processor 201. The processor 201 may be configured to execute programmed instructions stored in the memory 203. The processor 201 may execute instructions for performing auto-pairing of the vending device 104 with the user device 103. In one embodiment, the auto-pairing may be performed after scanning of the QR code displayed on the vending device 104. In one embodiment, the vending device 104 may enable the auto-pairing with the user device 103 when the user device 103 is within a predefined range of the location of the vending device 104. In another embodiment, the user device 103 may perform auto-pairing with the vending device 104 by auto-polling of the vending devices within the predefined range of the user device 103. Specifically, the user device 103 may initiate auto-polling of the vending devices within the predefined range of the user device and thereby display a list of vending devices on a display screen of the user device 103 identified as a result of the auto-polling technique. The user may select a vending device from the list of vending devices displayed for enabling the auto-pairing of the user device 103 with the vending device selected. In yet another embodiment, the user device 103 may perform auto-pairing with the vending device using one or more of tactile inputs, gesture inputs, and voice commands received from the user either via the user device 103 or the vending device 104 or both. In still another embodiment, the user device 103 may perform auto-pairing with the vending device having geospatial data (latitude or longitude or both) closely matching with the geospatial data of the user device 103.

In an embodiment, the user device 103 may be configured to display a product list which is transmitted by the processing unit 108 after scanning of the QR code displayed on the vending device 104. The product list received from the processing unit 108 may be based upon inventory information associated with the vending device 104, wherein the inventory information is stored within the memory of the processing unit 108. In some embodiments, the user device 103 may be configured to display the product list received from the processing unit 108 after the auto-pairing of the user device 103 and the vending device 104 through one or more of the tactile inputs received from the user, voice commands received from the user, gesture inputs received from the user, and geo-spatial data associated with the user device and the vending devices. The processing unit 108 may transmit the product list to the user device through the wireless communication protocol selected from a group comprising, but not limited to, Bluetooth communication protocol, Near Field Communication (NFC), Radio Frequency (RF) protocol, an infra-red (IR) protocol, ZigBee protocol and the like. In another embodiment, the processing unit 108 may transmit the product list to the user device through the router within the vending device 104. In one embodiment, the user device 103 may be configured to display the product list after decoding a string, containing the inventory information, received from the processing unit 108. Further, based upon the string decoded, the user device 103 may be configured to populate the product list for selection of one or more products of the plurality of products stored in the vending device 104 by the user of the user device 103.

In one embodiment, the system 101 may store the details of inventory information associated with the vending device 104 in communication with the user device 103. In an embodiment, the details of the inventory information may be stored within a repository of the system 101. Further, the system 101 may transmit a product list which is generated based upon the inventory information stored within the repository. The user device 103 may be configured to display the product list received from the system 101. In one embodiment, the user device 103 may display the product list after the auto-pairing of the user device 103 with the vending device 104. The system 101 may transmit the product list corresponding to the vending device auto-paired with the user device 103. In one embodiment, the user device 103 may auto-pair with the vending device 104 after scanning of the QR code displayed on the vending device 104. In another embodiment, the user device 103 may be configured to auto-pair with the vending device 104 through one or more of tactile inputs received from the user, voice commands received from the user, gesture inputs received from the user, and geo-spatial data associated with the user device and the vending devices. The system 101 may transmit the product list corresponding to the vending device identified to be in communication with the user device 103 coupled with the system 101. In one embodiment, the system 101 may identify the vending device based upon vending device identifier contained in the QR-code scanned by the user device 103. In another embodiment, the system 101 may identify the vending device based upon geo-spatial location of the user device 103 and the vending devices. Further, the user device 103 may be configured to populate the product list for selection of one or more products of the plurality of products stored in the vending device 104 by the user of the user device 103.

Further, the processor 201 may execute instructions for receiving information from the user device 103. In one embodiment, the user device may be configured to receive the information after successful transaction corresponding to one or more products selected from the product list displayed on user device. The user device 103 may further transmit the information received to the processing unit 108 (and hence to the processor 201) of the vending device. In one embodiment, the information may comprise at least a code. In one embodiment, the processor 201 may execute programmed instructions for decoding the vending data residing in the code. The processor 201 may further transmit the vending data to the VMC 105 in order to enable dispensing of the one or more products from the vending device 104. In one embodiment, the vending data may comprise one or more indicators/identifiers identifying the product to be dispensed to the user. In one example, the vending data may comprise a row and/or column identifier identifying the row and/or column holding the said product. In another embodiment, the vending data may comprise either of a compartment identifier, a rack identifier, or a shelf identifier identifying the compartment, or the rack or the shelf holding the said product. In an embodiment, the processor 201 may execute programmed instructions for decoding the vending data residing in the code in order to dispense the one or more products from the vending device.

Figure 3:
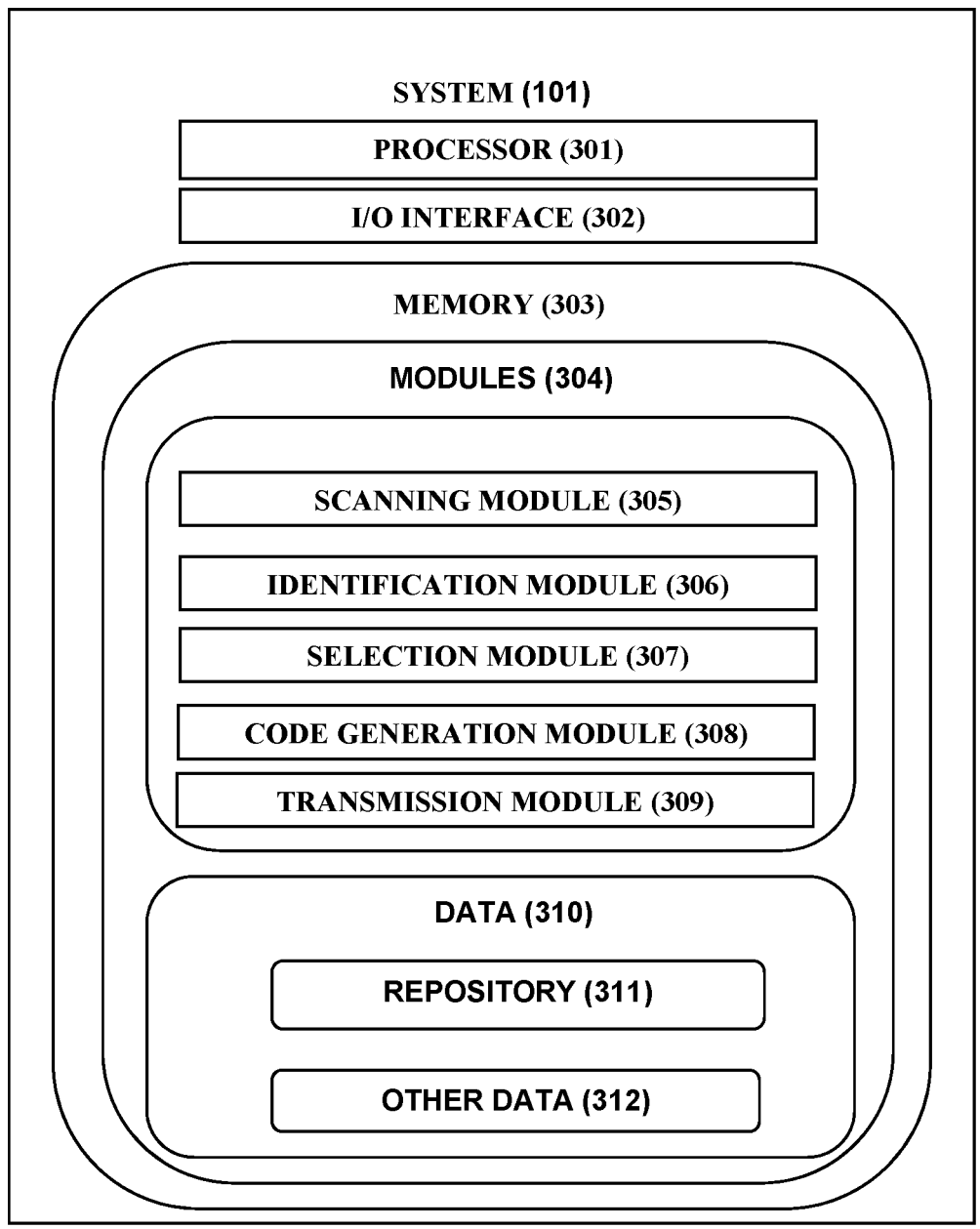
FIG. 3 illustrates the system 101 and components of the system 101, in accordance with the embodiment of the present disclosure.

Now referring to FIG. 3, components of the system 101 are illustrated, in accordance with an embodiment of the present subject matter. The system 101 may comprise at least one processor 301, an input/output (I/O) interface 302, a memory 303, modules 304 and data 310. In one embodiment, the at least one processor 301 may be configured to fetch and execute computer-readable instructions stored in the memory 303.

In one embodiment, the I/O interface 302 may include a variety of software and hardware interfaces, for example, a web interface, a graphical user interface, and the like. The I/O interface 302 may allow the system 101 to interact with the user devices 103. Further, the I/O interface 302 may enable the user device 103 to communicate with other computing devices, such as web servers and external data servers (not shown). The I/O interface 302 can facilitate multiple communications within a wide variety of networks and protocol types, including wired networks, for example, LAN, cable, etc., and wireless networks, such as WLAN, cellular, or satellite. The I/O interface 302 may include one or more ports for connecting to another server.

In an implementation, the memory 303 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory 303 may include modules 304 and data 310.

The modules include routines, programs, objects, components, data structures, etc., which perform particular tasks, functions or implement particular abstract data types. In one implementation, the modules may include a scanning module 305, an identification module 306, a selection module 307, a code generation module 308, a transmission module 309 and other modules (not shown in figure). The other modules may include programs or coded instructions that supplement applications and functions of the user device.

In one embodiment, the data 310 may comprise repository 311 and other data 312. In one exemplary embodiment, the repository 311 may be configured to store data processed, received, and generated by one or more of the modules 304. In one exemplary embodiment, the repository 311 may store the details of the inventory information, vending device identifier (ID) and corresponding MAC address of each vending device. The other data 312 may include data generated as a result of the execution of one or more modules.

In one implementation, a user may use the user device 103 to register with the system 101 via I/O interface 302. The user may use an application installed over the user device 103 in order to register with the system 101.

In one embodiment, the identification module 306 may comprise a programmed instruction to identify the vending device 104 within a predefined range of the location of the user device 103. In one embodiment, the location of user device 103 may be captured via GPS module within the user device 103. In one embodiment, the processor 301 may comprise a programmed instruction to enable the user to scan a QR code displayed on the vending device 104. In one embodiment, the scanning module 305 may enable scanning of the QR code displayed on the vending machine using an image capturing means of the user device. In one embodiment, the QR code may comprise details of the vending device 104 in order to perform verification of the identified vending device 104. In one embodiment, the user device 103 may display products available in the vending device 104 after the pairing of the user device 103 with the vending device 104. In one embodiment, the user device 103 may communicate with the vending device 104 by auto pairing with the processing unit 108. In one embodiment, the user device 103 may be paired with the processing unit 108 through the wireless communication protocol selected from a group comprising, but not limited to, Bluetooth communication protocol, Near Field Communication (NFC), Radio Frequency (RF) protocol, an infra-red (IR) protocol, ZigBee protocol and the like. In another embodiment, the user device 103 may be paired with the processing unit 108 through a router (not shown) placed within vending device 104. The router may provide connectivity with one or more user devices without any internet connection. In another embodiment, the user device 103 may perform auto-pairing with the vending device with the user device by auto-polling of the vending devices in the predefined range of the user device. Specifically, the user device 103 may initiate auto-polling of the vending devices within the predefined range of the user device and thereby display the list of vending devices on a display screen of the user device 103 identified as a result of the auto-polling technique. The user may select a vending device from the list of vending devices displayed for enabling the auto-pairing of the user device 103 with the vending device selected. In yet another embodiment, the user device 103 may perform auto-pairing with the vending device using one or more of tactile inputs, gesture inputs, and voice commands received from the user either via the user device or the vending device or both. In still another embodiment, the user device 103 may perform auto-pairing with the vending device having geospatial data (latitude or longitude or both) closely matching with the geospatial data of the user device 103.

In one embodiment, the processing unit 108 may store inventory details of the vending machine. The processing unit 108 may transmit a product list to the user device through the router or the wireless communication protocol selected from a group comprising, but not limited to, Bluetooth communication protocol, Near Field Communication (NFC), Radio Frequency (RF) protocol, an infra-red (IR) protocol, ZigBee protocol and the like. In one embodiment, the user device 103 may be configured to display the product list after decoding the string, containing the inventory information, received from the processing unit 108. Further, the user device 103 may be configured to populate the product list for selection of one or more products of the plurality of products stored in the vending device by the user. In some embodiments, the system 101 may store the details of inventory information. The user device 103 may be configured to display a product list which is received from the system 101. Further, the system 101 may transmit the product list which is generated based upon the inventory information stored within the repository 311 of the system 101. In one embodiment, the user device 103 may display the product list after the auto-pairing of the user device 103 with the vending device 104. In one embodiment, the user device 103 may auto-pair with the vending device 104 after scanning of the QR code displayed on the vending device 104. In another embodiment, the user device 103 may be configured to auto-pair with the vending device 104 through one or more of tactile inputs received from the user, voice commands received from the user, gesture inputs received from the user, and geo-spatial data associated with the user device 103 and the vending devices.

The selection module 307 may enable the user to select the product from the vending device 104 through the user interface of the user device 103. The processor 301 may execute a programmed instruction for enabling the user to complete an electronic transaction for purchasing of the product selected on the vending device. In one embodiment, the electronic transaction may be performed using online transaction means selected from a group comprising a digital wallet, a debit/credit card, a net banking, and the like. In one embodiment, the selection module 307 may execute a programmed instruction to enable the user to select multiple products from the vending device 104 through the user interface of the user device 103. Further, the processor 301 may execute an instruction to enable user to purchase multiple selected products using a single electronic transaction. In one exemplary embodiment, the user may select two units of soft drink bottles, 3 units of snacks and process a cumulative payment of total cost of the all the selected items in the single electronic transaction.

In one embodiment, the code generation module 308 may comprise a programmed instruction to generate a code after successful completion of the electronic transaction. In one embodiment, the code may be a unique alphanumeric code which at least comprises characters that identifies location of the vending device. In one embodiment, the transmission module 309 may further comprise a programmed instruction for enabling the user device 103 to transmit the information to the processing unit 108. In one embodiment, the information transmitted to the processing unit 108 may comprise the code generated by the code generation module 308. The processing unit 108 may be configured to process the information in order to auto-press the keys of keypad to dispense the product. In another embodiment, the processing unit 108 may be configured to auto-press the keys corresponding to the unique alphanumeric code on the keypad. In one embodiment, the processing unit 108 may be configured to auto populate the unique alphanumeric code in the processing unit 108 of the vending device 104 in order to trigger the vending device 104 to dispense the product to the user. Specifically, the processing unit 108 may auto-press the digits in the keypad 107 that is indicative of the product being selected by the user and thereby instructing the VMC 105 to dispense the product to the user. In one embodiment, the processing unit 108 may decode the vending information residing in the code. The processing unit 108 may transmit vending details to the VMC 105 in order to enable dispensing of the product from the vending device 104. In one embodiment, the processing unit 108 may bypass the MDB/VCCS/BDV protocol and enable dispensing of the product from the vending device 104 through the VMC 105. In one embodiment, if the vending device 104 is an existing coin/currency acceptor device, the VMC 105 may dispense the product based upon confirmation of credit to the vending machine 104, wherein such confirmation of credit is received via the protocol including, but not limited to, MDB/VCCS/BDV protocol. In this embodiment, MDB/VCCS/BDV protocol may convert the cash (i.e. either a coins or notes) or electronic money into the credit to the vending machine 104. Further, the processor 301 may be configured execute programmed instructions to send a payment confirmation message to the user device 103 only after successful dispensing of the product from the dispensing area of the vending device 103.

In another embodiment, if the vending device 104 is an online/cashless device with no provision to accept either a coin or notes (i.e. cash), the processing unit 108 may bypass MDB/VCCS/BDV protocol while performing the electronic/cashless transaction. Further, the processing unit 108 may be configured to control dispense of the products from the vending device 104.

In one embodiment, the processor 301 may execute the programmed instructions for instantaneously initiating refund of amount paid for the product purchase in a scenario of occurrence of failure in dispensing of the product from the vending device 104. In one embodiment, the processing unit 108 may update the details of the purchase and further transmit failure message to the user device 103 through the Bluetooth communication protocol. The system 101 may initiate the refunding of the paid amount. Further, the processor 301 may execute programmed instruction to send a refund confirmation message to the user device 103 indicating successful processing of the refund on account of failure to vend a product or a service by the vending device 104. The said refund confirmation message may be send immediately after the confirmation of the payment.

Figure 4:
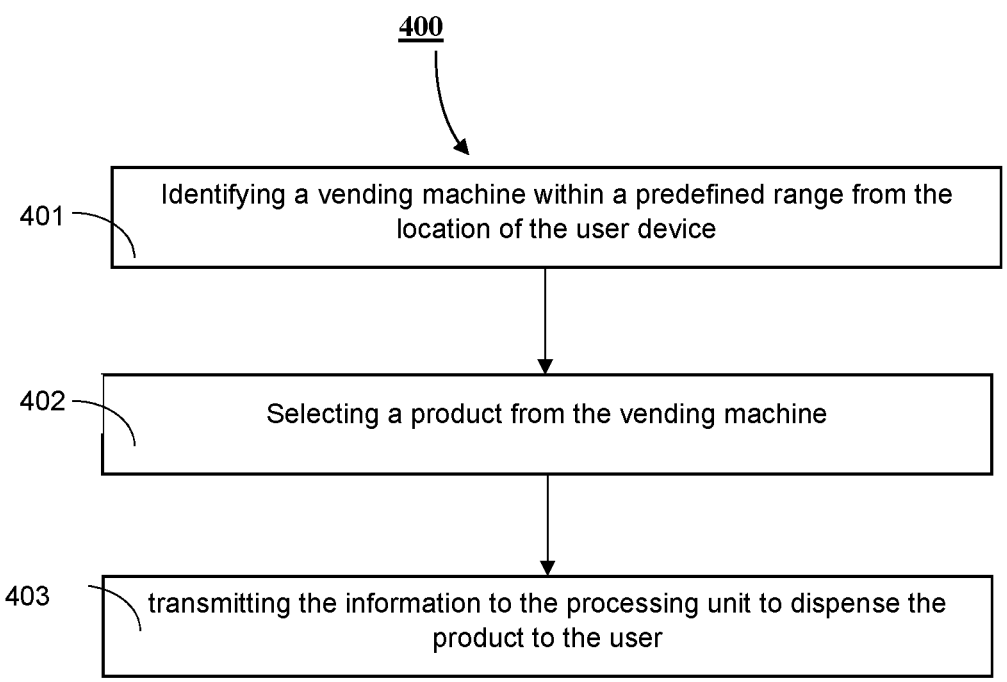
FIG. 4 illustrates a method 400 for remotely controlling dispensing of product(s) from the vending device, in accordance with an embodiment of the present subject matter.

Now referring to FIG. 4, a method for remotely controlling dispensing of one or more product(s) from the vending device is illustrated, in accordance with an embodiment of the present subject matter.

As shown, at step 401, a vending device within a predefined range of the user device 103 may be identified. In one implementation, the vending device may be identified by the system 101 using the identification module 306 stored in the memory 304. In one embodiment, the location of user device 103 may be captured via GPS module within the user device 103.

At step 402, the user may be enabled to select the product from the vending device 104 through the user interface of the user device 103. In one embodiment, the processing unit 108 may configured to transmit inventory details to the user device 103. Further, the user may be enabled to complete an electronic transaction for purchasing of the product selected on the vending device. In one implementation, the user may be enabled to select the product and complete the electronic transaction for purchasing the said product. In one embodiment, the user may enable to select the product only after auto-pairing of user device 103 with the vending device 104. In one embodiment, the auto-pairing may be performed after the scanning of the QR code displayed on the vending device 104 using the user device 103.

At step 403, the user device 103 may be enabled to transmit the information to the processing unit 108. In one embodiment, the information may at least comprise code. In one embodiment, the code may be unique alphanumeric code. In one implementation, the user device 103 may be enabled to transmit information by the transmission module 309 stored in the memory 303. The processing unit 108 may be configured to auto populate the unique alphanumeric code to trigger the vending device 104 to dispense the product to the user. Specifically, the processing unit 108 may auto-press the digits in the keypad 107 that is indicative of the product being selected by the user. In one embodiment, the processing unit 108 is configured to decode the vending data residing in the code in order to enable dispense from the vending device to the user. In one embodiment, the code may be obtained from the information. In one embodiment, the processing unit 108 may be configured to transmit vending details to the VMC 105 in order to enable dispense from the vending device 104. In another embodiment, the processing unit 108 may be configured to enable dispense from the vending device 104 directly.

Figure 5:
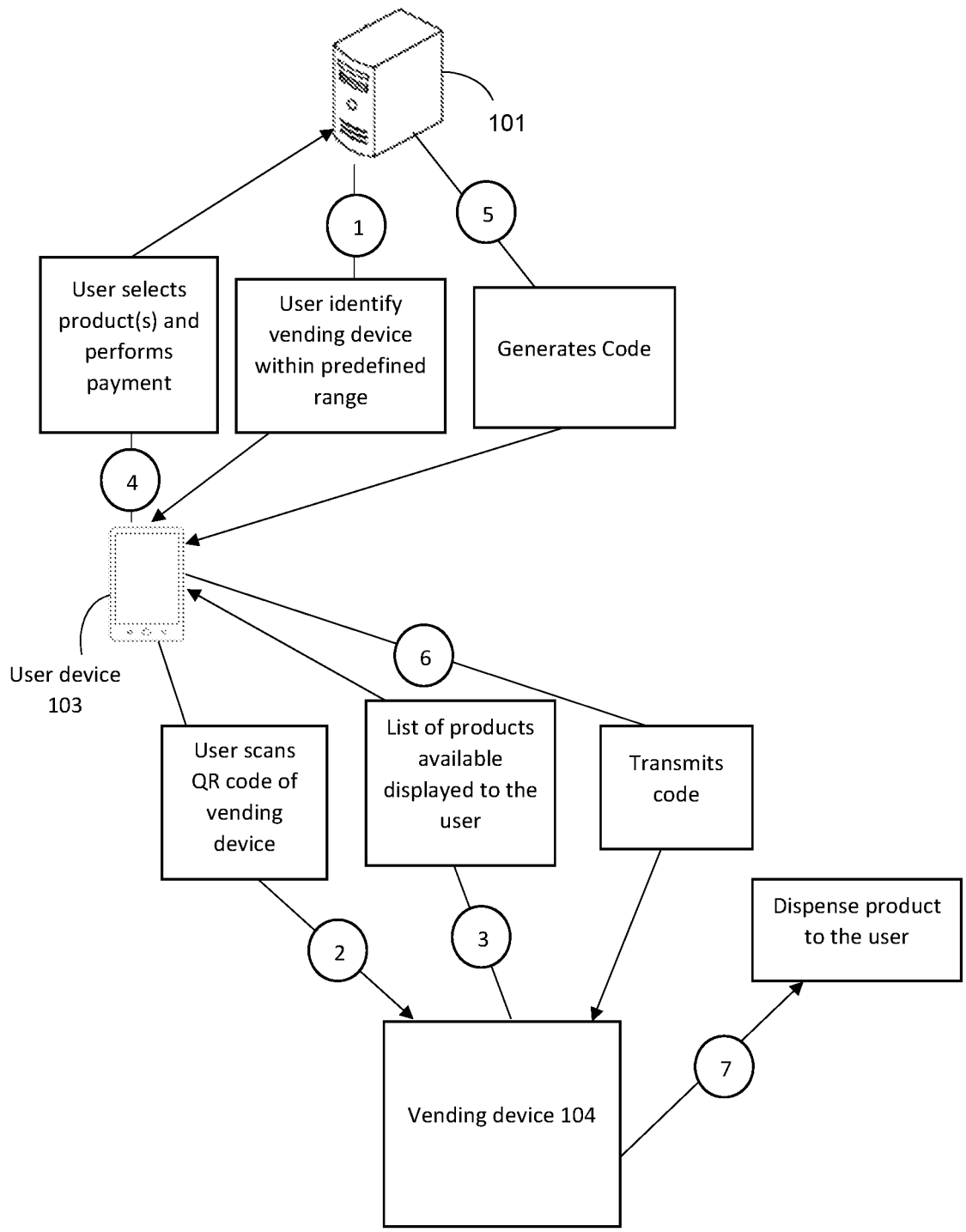
FIG. 5 illustrates an example of remotely controlling dispensing of product(s) from the vending device, in accordance with an embodiment of the present subject matter.

In one exemplary embodiment, the system 101 may control dispense of the product from the vending device as shown in FIG. 5. Referring to FIG. 5, the system 101 may enable the user device 103 to identify a vending device 104 within predefined range from a location of the user device 103. In one embodiment, the location of user device 103 may be captured via GPS module within the user device 103. The user device 103 may perform auto-pairing of the vending device 104 with the user device 103. The user device 103 may scan a QR code displayed on the vending device 104 to perform auto-pairing of the user device 103 and the vending device 104. The user may select, via the user device 103, one or more products of a plurality of products capable of being vend through the vending device 104. The user may perform electronic transaction associated with the one or more products selected from plurality of products. The system 101 may generate unique alphanumeric code after successful completion of transaction and send the unique alphanumeric code to the user device 103. The user device 103 may transmit the unique alphanumeric code to the vending device 104. The processing unit 108 of the vending device 104 may be configured to decode the information residing in the code in order to trigger dispensing of a product from the vending device 104.

Figure 6:
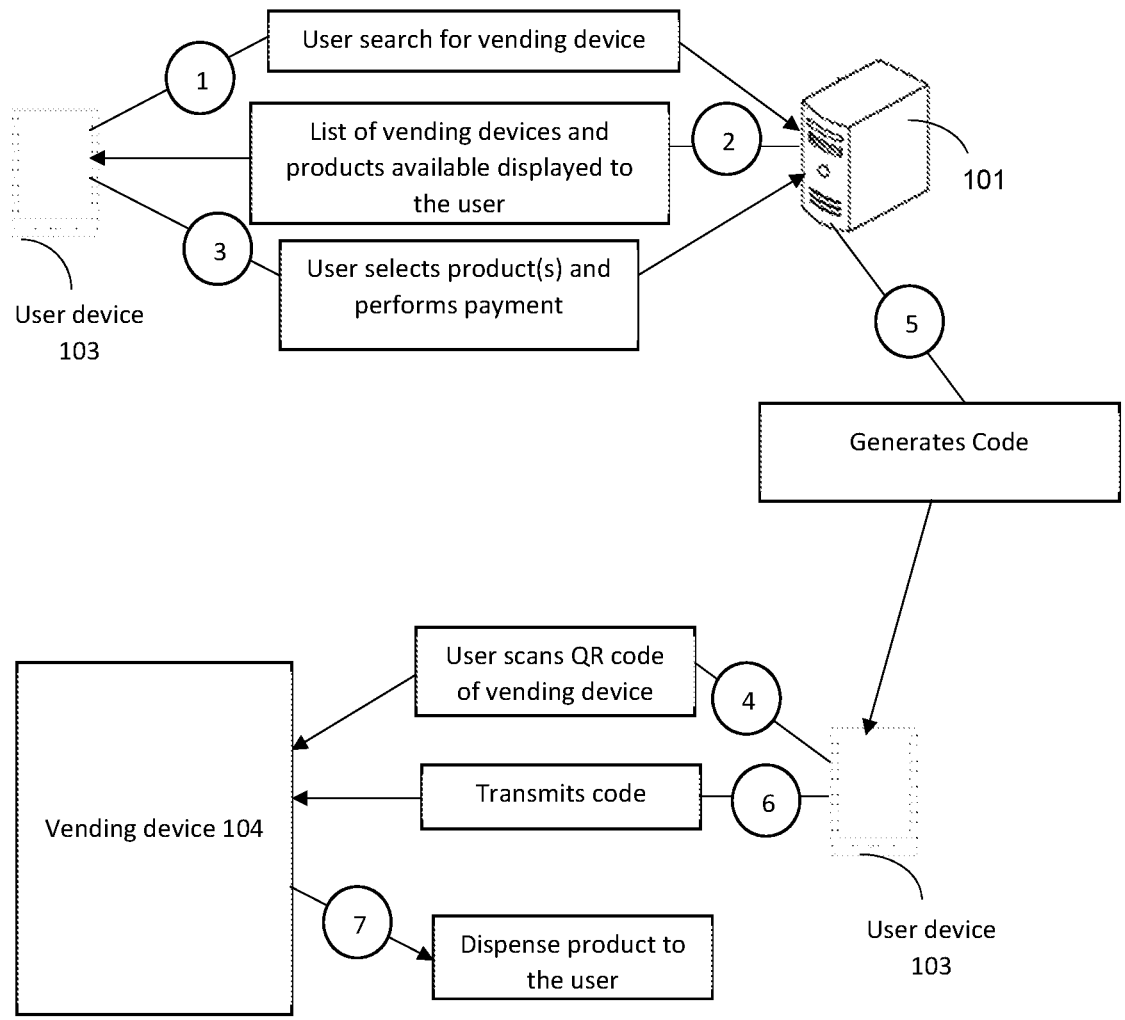
FIG. 6 illustrates an example of post vending of one or more selected products from the vending device, in accordance with an embodiment of the present subject matter.

In another exemplary embodiment, the system 101 may enable the user to post the vending of one or more selected products from the vending device as shown in FIG. 6. Referring to FIG. 6, the system 101 may identify a vending device within predefined range of the user device 103. In one embodiment, the location of user device 103 may be captured via GPS module within the user device 103. In one embodiment, the system 101 may enable the user to search for the vending device 104 in the specific area/region. The system may enable the user to select through the user device 103 a product of a plurality of products capable of being vend through the vending device 104. The system 101 may enable the user to perform the electronic transaction associated with one or more selected products in order to post the vending of one or more selected products from the vending device 104. When the user approaches the vending device 104, the system may enable the user to scan the QR code displayed on the vending device 104. The user may receive a unique alphanumeric code on the user device 103. The user device 108 may transmit the unique alphanumeric code to the vending device 104. The processing unit 108 of the vending device 104 may receive the unique alphanumeric code. Further, the processing unit 108 may be configured to decode the vending information residing in the code in order to dispense product(s) from the vending device 104 to the user. In an example, the user approaches the vending device A05 which is the same machine selected by the user to post vend a coke from the vending device. The user may scan the QR code displayed on the vending device 104. The user device 104 may receive the alphanumeric code which is further transmitted to the vending device in order to enable dispensing of the one or more products selected by the user. In one embodiment, the vending device and user device may be configured to provide voice enabled commands to enable function of the vending device or the user device. In one exemplary embodiment, the user device 103 may scan QR code of the vending device when a voice command is received from the user. The vending device 104 may also provide an audio assistance to the user at the time of selection of the products or dispensing of the products from the vending device 104.

In some embodiments, the user device 103 and the vending device 104 may enable the user to interact with either of the user device 103 or the vending device 104 through tactile inputs. In some embodiments, the user device 103 and the vending device 104 may be configured to interact with the user through gesture control mechanism.

Figure 7:
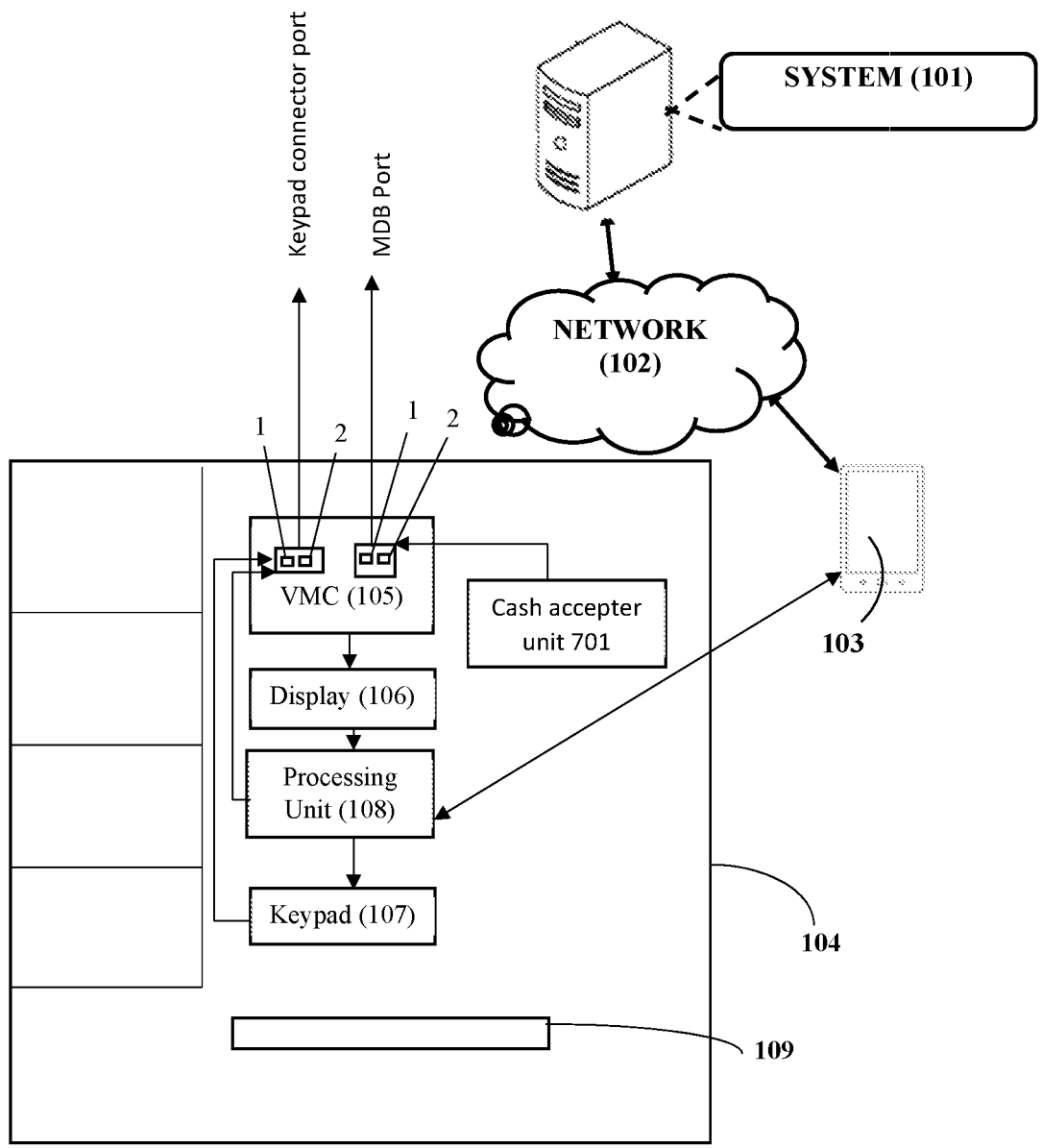
FIG. 7 illustrates an example of dispensing of the product (s) from the vending device via inserting a cash (i.e. coin/currency note), in accordance with an embodiment of the present subject matter.

Now referring to FIG. 7, an example of dispensing of the product (s) from the vending device via inserting a cash (e.g. coin/currency note) is illustrated. In one embodiment, a cash acceptor unit 701 may be connected to the VMC 105 through the MDB port-1. In one embodiment, the keypad 107 may be electronically coupled with the VMC 105 via keypad connector port-1 in order to tap vending data from the user. In one embodiment, the VMC 105 may freeze the keypad 107 until the cash credit is received. After receiving the cash credit, the VMC 105 may release the keypad in order to enable the user/consumer to select product from vending device 104. In one embodiment, the processing unit 108 may tap the vending data through the keypad connector port-2 of the VMC 105. In one embodiment, the VMC 105 may be configured to dispense product(s) from the vending device 104.

In some embodiments, the VMC may not be configured to perform tapping of the signal received from the keypad 107. In such cases, the keypad 107 may comprise a thin film of silicone (Not shown in the FIG. 7) behind the keypad in order to provide signal for tapping. The processing unit 108 may be configured to tap the signal from thin film of silicone behind the keypad 107. Further, the processing unit 108 may be configured to dispense product(s) from the vending device 104. In one embodiment, the processing unit 108 of the vending device 104 may update the details of the inventory information after completion of the dispensing. Such updated inventory information may be used by the system 101 to update its own inventory information through the user device 103 at the time of next cashless transaction.

Figure 8:
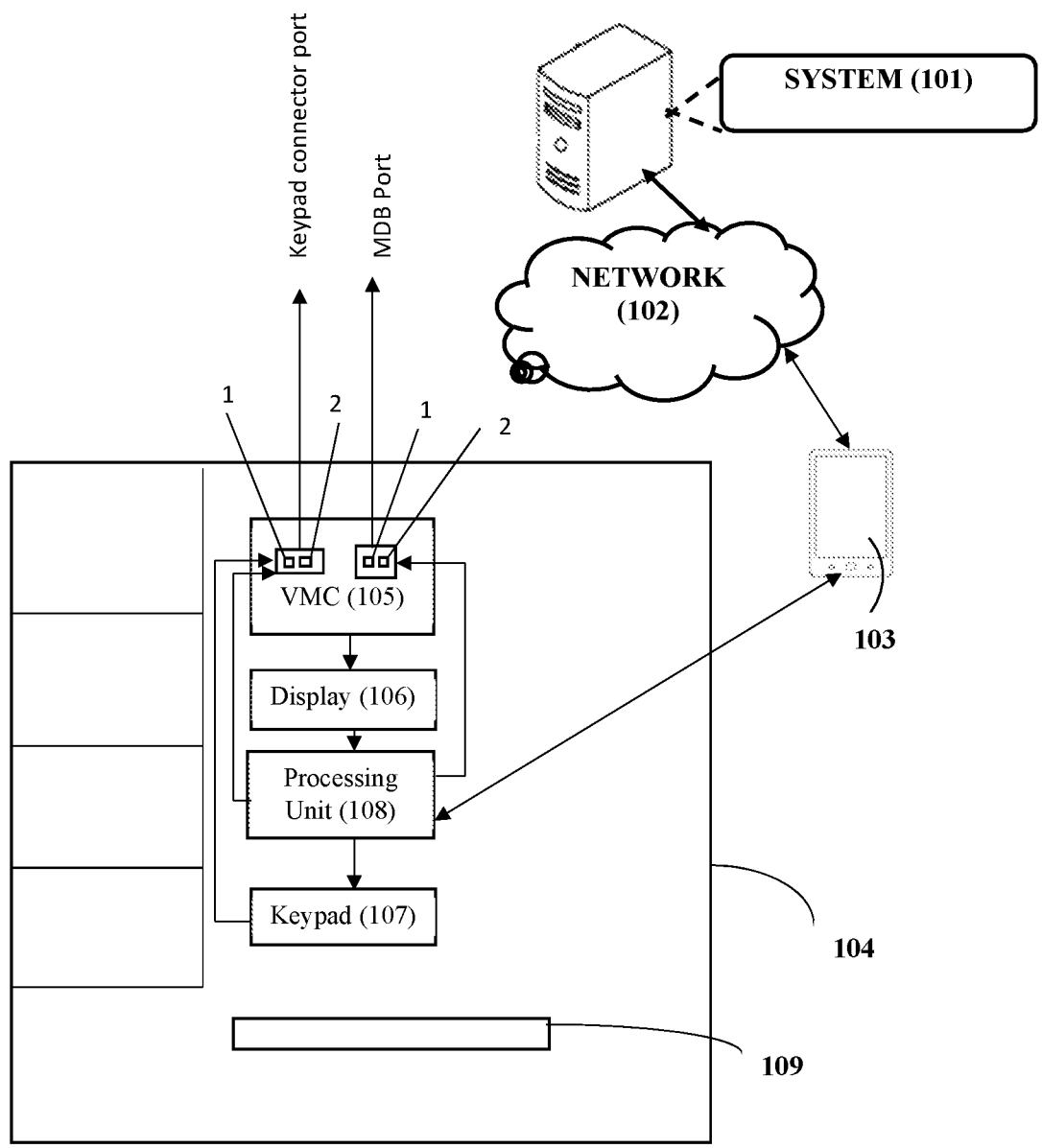
FIG. 8 illustrates an example of dispensing of the product(s) from the vending device via a cashless payment, in accordance with an embodiment of the present subject matter.

Now referring to FIG. 8, an example of dispensing of the product(s) from the vending device via cashless payment is illustrated. In one embodiment, the keypad 107 may be electronically coupled with the VMC 105 via keypad connector port-1 in order to receive vending data from the user. In one embodiment, the VMC 105 may freeze the keypad until the cashless payment is received. After receiving the cashless payment, the VMC 105 may release the keypad in order to enable user/consumer to select product from vending device 104. In an embodiment, the processing unit enables auto-pressing of keys on the keypad indicting the products selected by the user on the vending device. In one embodiment, the processing unit 108 may tap the vending data through the keypad connector port-2 of the VMC 105. In one embodiment, VMC 105 may be configured to dispense product(s) from the vending device 104. In another embodiment, the processing unit 108 may tap the vending data from the keypad wherein, the keypad 107 may be connected to the processing unit 108 through the keypad connector port. Further, the processing unit 108 may transmit vending details to the VMC 105 in order to dispense product(s) from the vending device 104. In one embodiment, the processing unit 108 of the vending device may update the details of the inventory information after completion of the dispensing. Such updated inventory information may be used by the system 101 to update its own inventory information through the user device 103.

Figure 9:
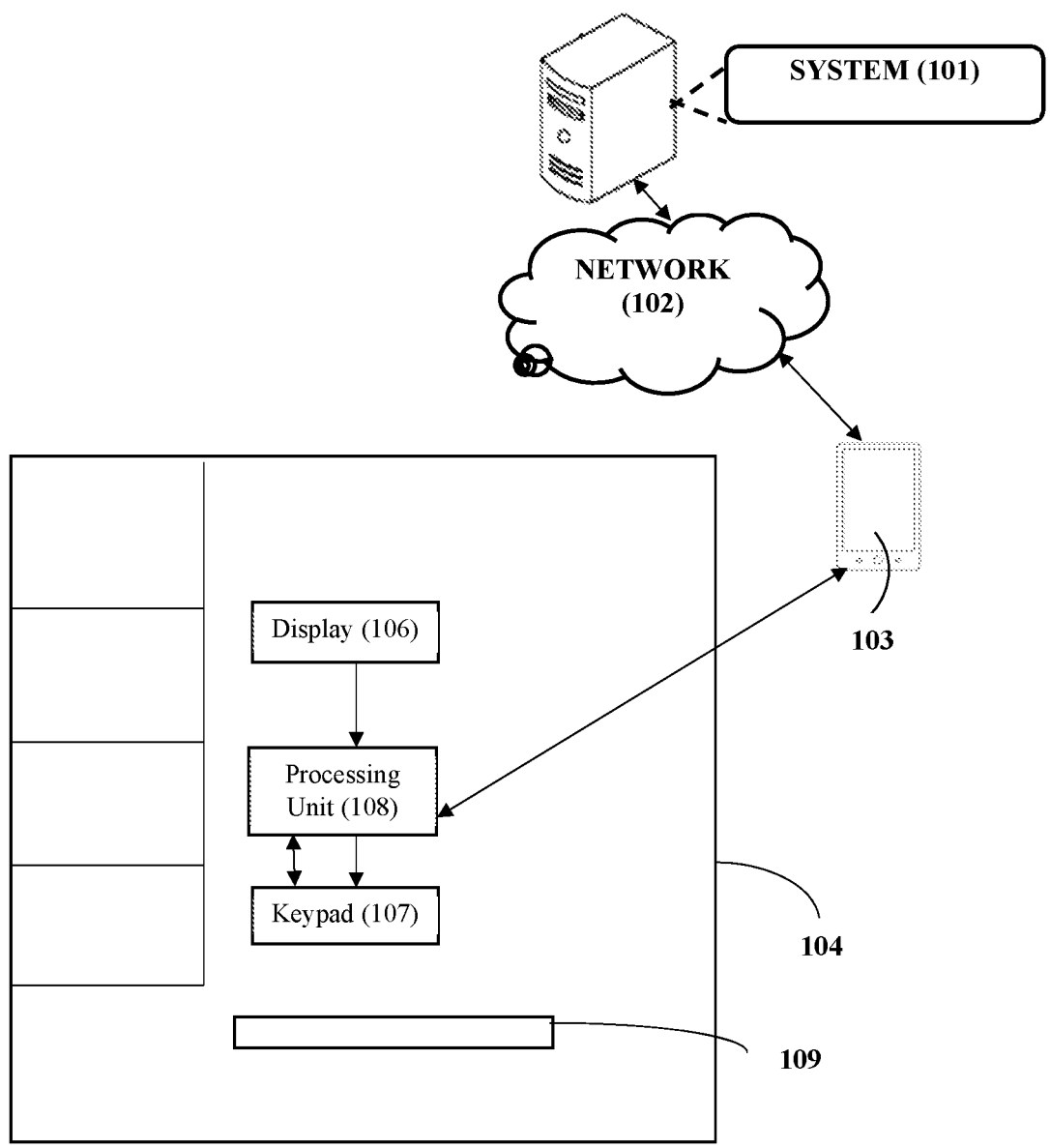
FIG. 9, illustrates an example of dispensing of the product(s) from the vending device via the processing unit, in accordance with an embodiment of the present subject matter.

Now referring to FIG. 9, an example of dispensing of the product(s) from the vending device via the processing unit is illustrated. In one embodiment, the keypad 107 may be connected to the processing unit 108 through the keypad connector port. The processing unit 108 may be configured to freeze the keypad 107 until the unique code is received from the user device 103. In one embodiment, the unique code may be received from the user device 103 after completion of electronic transaction associated the product(s) selected from the vending device using user device 103. After receiving the code, the processing unit 108 may release the keypad 107 in order to perform auto-pressing of the keys of the keypad. In one embodiment, the processing unit 108 may be configured to perform tapping of the keys of the keypad 107. Further, the processing unit 108 may be configured to dispense product(s) from the vending device 104.

Figure 10:
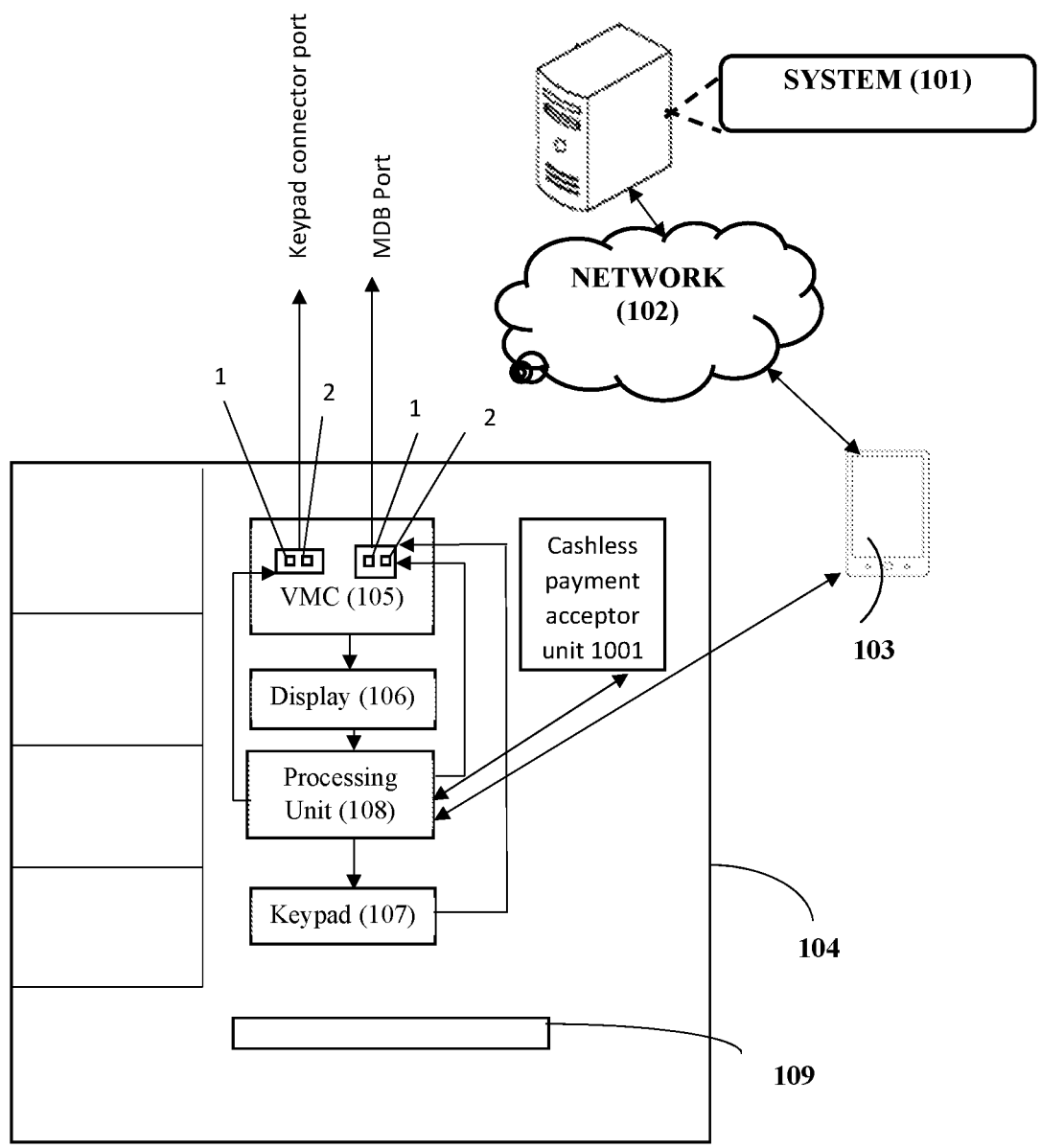
FIG. 10 illustrates an example of dispensing of the product(s) from the vending device via the processing unit coupled with an existing and/or other cashless payment acceptor unit within the vending device, in accordance with an embodiment of the present subject matter.

Now referring to FIG. 10, an example of dispensing of the product(s) from the vending device via the processing unit coupled with an existing and/or other cashless payment acceptor unit of the vending device is illustrated. In one exemplary embodiment, the processing unit 108 may be electronically coupled with the existing and/or other cashless payment acceptor unit 1001 of the vending device through UART port-1 (Not shown in the figure). Further, the processing unit 108 may be connected to the VMC 105 through UART port-2 (Not shown in the figure). In one embodiment, the keypad 107 may be electronically coupled with the VMC 105 via keypad connector port in order to receive vending data from the user. The VMC 105 may be configured to freeze the keypad 107 until the existing and/or other cashless payment acceptor unit 1001 receives the payment from the user. In one exemplary embodiment, the existing and/or other cashless payment acceptor unit 1001 may be a debit/credit card acceptor machine, a near field communication contactless payment machine and a like. After receiving the payment, the processing unit 108 may indicate the credit of the payment to the VMC 105 through the MDB protocol. The VMC 105 may release the keypad in order to enable the user/consumer to select product from vending device 104. Further, the VMC 105 may be configured to tap the vending data entered by the user in order to dispense products from vending device 104. In some embodiments, if the VMC 105 is unable to tap the vending data, the processing unit 108 may tap the vending data and transmit the vending data to the VMC 105 in order to trigger the dispensing of the products from vending device 104 by the VMC 105.

Still referring to FIG. 10, in a scenario wherein the VMC is not available in the vending device, then the processing unit 108 may be electronically coupled with the existing and/or other cashless payment acceptor unit of the vending device through UART port-1 (Not shown in the figure). In one embodiment, the keypad 107 may be electronically coupled with the processing unit 108 via the keypad connector port in order to receive vending data from the user. The processing unit 108 may be configured to freeze the keypad 107 until the existing and/or other cashless payment acceptor unit receives the payment from the user. In one exemplary embodiment, the existing and/or other cashless payment acceptor unit may be a debit/credit card acceptor machine, a near field communication contactless payment machine and a like. After receiving the payment, the processing unit 108 may release the keypad in order to enable user/consumer to select product from vending device 104. Further, the processing unit 108 may be configured to tap of the vending data entered by the user. The processing unit 108 may dispense products from vending device 104.

Although implementations for controlling of dispensing of product(s) from a vending device have been described in language specific to structural features and/or methods, it is to be understood that the appended claims are not necessarily limited to the specific features or methods described. Rather, the specific features and methods are disclosed as examples of implementations for controlling of dispensing of product(s) from a vending device.

What is claimed is:

1. A processing unit to enable controlling of dispensing of product(s) from a vending device, the processing unit comprising:
    a processor;
    a communication port/interface, wherein the communication port/interface is configured to enable retrofitting of the processing unit with a Vending Machine Controller (VMC) in order to control dispensing of the product(s) from the vending device;
    a transceiver configured to communicate with a user device; and
    a memory coupled with the processor, wherein the processor is configured to execute programmed instructions stored in the memory for
        enabling auto-pairing of the vending device with the user device;
        receiving a unique alphanumeric code from the user device, wherein the user device is configured to receive the unique alphanumeric code in response to transaction corresponding to one or more products selected from a product list displayed on the user device;
        decoding vending data from the unique alphanumeric code; and auto-pressing the keys of a keypad electronically coupled with the processing unit based upon the vending data decoded, wherein the auto-pressing triggers the Vending Machine Controller (VMC) to dispense a product from the vending device.

2. The processing unit of the claim 1, wherein the transceiver is a router or a short-range transceiver, wherein the short-range transceiver is configured to communicate with the user device using a short-range communication protocol selected from a group comprising, Bluetooth communication protocol, Near Field Communication (NFC), Radio Frequency (RF) protocol, an infra-red (IR) protocol, and ZigBee protocol.

3. The processing unit of claim 1, wherein the auto-pairing is performed based upon either of scanning of a QR code displayed on the vending device, or auto-polling of vending devices, or tactile inputs received from the user, or voice commands received from the user, or gesture inputs received from the user, or geo-spatial data associated with the user device and the vending devices, and wherein the auto-pairing enables the receipt of the information from the user device.

4. The processing unit of claim 1, wherein the processing unit is further configured for:
transmitting the product list to be displayed on the user device, wherein the product list is generated based upon inventory information, stored in the processing unit, associated with the vending device,
tapping of the vending data either through the VMC or the keypad, wherein the vending data is associated with one of a cash transaction or a cashless transaction and
updating the inventory information associated with the vending device based upon tapping of the vending data.

5. The processing unit of claim 4, wherein the processing unit is configured to perform tapping through a keypad connector port associated with the keypad or through a thin film of a silicon attached to the keypad.

6. A processing unit to enable controlling of dispensing of product(s) from a vending device, the processing unit comprising:
a processor;
a transceiver configured to communicate with a user device; and
a memory coupled with the processor, wherein the processor is configured to execute programmed instructions stored in the memory for
enabling auto-pairing of a vending device with the user device;
receiving a unique alphanumeric code from the user device, wherein the user device is configured to receive the unique alphanumeric code in response to a transaction corresponding to one or more products selected from a product list displayed on the user user device;
decoding vending data from the unique alphanumeric code; and
auto-pressing the keys of a keypad electronically coupled with the processing unit based upon the vending data decoded to enable dispensing of the product from the vending device.

7. The processing unit of the claim 6, wherein the transceiver is a router or a short-range transceiver, wherein the short-range transceiver is configured to communicate with the user device using a short-range communication protocol selected from a group comprising Bluetooth communication protocol, Near Field Communication (NFC), Radio Frequency (RF) protocol, an infra-red (IR) protocol, and ZigBee protocol.

8. The processing unit of claim 6, wherein the auto-pairing is performed based upon either of scanning of a QR code displayed on the vending device, or tactile inputs received from the user, or voice commands received from the user, or gesture inputs received from the user, or geo-spatial data associated with the user device and the vending devices, and wherein the auto-pairing enables the receipt of the code from the user device.

9. The processing unit of claim 6, wherein the processing unit is further configured to:
transmit the product list to be displayed on the user device, wherein the product list is generated based upon inventory information, stored in the processing unit, associated with the vending device,
tap the vending data either through the VMC or the keypad, wherein the vending data is associated with one of a cash transaction or a cashless transaction and
update the inventory information associated with the vending device based upon tapping of the vending data.

10. A system for remotely controlling dispensing of product(s) from a vending device, the system comprising
a processor; and
a memory coupled with the processor, wherein the processor is configured to execute programmed instructions stored in the memory for
identifying a vending device within a predefined range of the location of a user device;
enabling the user to select, via the user device, a product of a plurality of products capable of being vended through the vending device; and
transmitting, via the user device, a unique alphanumeric code to a processing unit of the vending device, wherein the processing unit is configured to decode vending data from the unique alphanumeric code and auto-press the keys of a keypad electronically coupled with the processing unit based upon the vending data decoded in order to trigger dispensing of a product from the vending device.

11. The processing unit of the claim 10, wherein the transceiver is a router or a short-range transceiver, and wherein the short-range transceiver is configured to communicate with the user device using a short-range communication protocol selected from a group comprising Bluetooth communication protocol, Near Field Communication (NFC), Radio Frequency (RF) protocol, an infra-red (IR) protocol, and ZigBee protocol.

12. The system of claim 10, wherein the processor further executes a programmed instruction for displaying, via the user device, a product list in order to enable the user to select one or more products of the plurality of products in the product list, wherein the product list is received either from the processing unit or from the system.

13. The system of claim 10, wherein the processor further executes a programmed instruction for enabling auto-pairing of the user device with the vending device, wherein the auto-pairing is performed based upon scanning of a QR code displayed on the vending device, or tactile inputs received from the user, or voice commands received from the user, or gesture inputs received from the user, or geo-spatial data associated with the user device and the vending devices, and wherein the auto-pairing enables transmission of the information to the processing unit of the vending device in order to trigger the dispensing of the products from the vending device, and wherein the auto-pairing is performed either before or after the selection of the one or more products and the completion of associated electronic transaction.

14. The system of claim 10, wherein the vending device and the user device are configured to provide voice enabled commands to enable function of the vending device or the user device.

15. The system of claim 10, wherein the processing unit of the vending device is configured to control dispensing of the product(s) from the vending machine through a vending machine controller (VMC) associated with the vending device.

16. A method for remotely controlling dispensing of product(s) from a vending device, the method comprising
identifying, by a processor, a vending device within a predefined range of the location of a user device;
enabling, by the processor, the user to select, via the user device, a product of a plurality of products capable of being vend through the vending device;
enabling, by the processor, to transmit a unique alphanumeric code to a processing unit of the vending device via the user device, wherein the processing unit is configured to decode vending data from the unique alphanumeric code and auto-press the keys of a keypad electronically coupled with the processing unit based upon the vending data decoded in order to trigger dispensing of a product from the vending device.

17. The method of claim 16 further comprising displaying, via the user device, a product list in order to enable the user to select one or more products of the plurality of products in the product list, wherein the product list is received either from the processing unit or from a system communicatively coupled with the user device.

18. The method of claim 16 further comprising enabling, by the processor, auto-pairing of the vending device with the user device, wherein the auto-pairing is performed based upon scanning of a QR code displayed on the vending device, or tactile inputs received from the user, or voice commands received from the user, or gesture inputs received from the user, or geo-spatial data associated with the user device and the vending devices, wherein auto-pairing enables transmission of information to the processing unit of the vending device in order to trigger the dispensing of the products from the vending device, and wherein the auto-pairing is performed either before or after the selection of the product(s) and completion of associated electronic transaction.

* * * * *